United States Patent
Ohara

(10) Patent No.: US 10,490,112 B2
(45) Date of Patent: Nov. 26, 2019

(54) DRAWING APPARATUS AND DRAWING METHOD FOR REDUCED INFLUENCE OF LEAKAGE ON VISIBILITY OF A DISPLAY IMAGE

(71) Applicant: JVC KENWOOD Corporation, Yokohama-shi, Kanagawa (JP)

(72) Inventor: Tatsuya Ohara, Yokohama (JP)

(73) Assignee: JVCKENWOOD CORPORATION, Kanagawa (JP)

( * ) Notice: Subject to any disclaimer, the term of this patent is extended or adjusted under 35 U.S.C. 154(b) by 46 days.

(21) Appl. No.: 15/868,238

(22) Filed: Jan. 11, 2018

(65) Prior Publication Data
US 2018/0137797 A1 May 17, 2018

Related U.S. Application Data

(63) Continuation of application No. PCT/JP2016/002300, filed on May 11, 2016.

(30) Foreign Application Priority Data

Sep. 3, 2015 (JP) .................. 2015-173412
Mar. 25, 2016 (JP) .................. 2016-061069

(51) Int. Cl.
*G09G 3/02* (2006.01)
*G02B 27/01* (2006.01)
(Continued)

(52) U.S. Cl.
CPC ............. *G09G 3/02* (2013.01); *G02B 26/101* (2013.01); *G02B 27/0101* (2013.01);
(Continued)

(58) Field of Classification Search
CPC .................. G09G 3/2003; G09G 3/02; G09G 2310/0232; G09G 2320/0233;
(Continued)

(56) References Cited

U.S. PATENT DOCUMENTS

2006/0255243 A1* 11/2006 Kobayashi ........... G02B 26/101
250/208.1
2008/0094676 A1 4/2008 Andretta
(Continued)

FOREIGN PATENT DOCUMENTS

JP 2009-086159 A 4/2009
JP 2010-175671 A 8/2010
(Continued)

*Primary Examiner* — Premal R Patel
(74) *Attorney, Agent, or Firm* — Procopio, Cory, Hargreaves & Savitch LLP

(57) ABSTRACT

A drawing apparatus includes a laser light source unit configured to output laser light; a scanning mirror unit configured to reflect and scan the laser light; a drawing control unit configured to control an output value of the laser light of the laser light source unit based on display image data so that a display image is drawn by the laser light in a range scanned by the scanning mirror unit; and an output adjustment control unit configured to control the laser light source unit so that characteristic detection laser light for adjusting the output value is output outside a range in which the display image is drawn inside the range scanned by the scanning mirror unit. The output adjustment control unit controls the characteristic detection laser light to be output based on a display color at an end part of the display image.

5 Claims, 12 Drawing Sheets

(51) Int. Cl.
  *G09G 3/20* (2006.01)
  *H04N 9/31* (2006.01)
  *G02B 26/10* (2006.01)

(52) U.S. Cl.
  CPC ......... *G09G 3/2003* (2013.01); *H04N 9/3129* (2013.01); *H04N 9/3132* (2013.01); *H04N 9/3155* (2013.01); *H04N 9/3161* (2013.01); *H04N 9/3194* (2013.01); *G02B 2027/014* (2013.01); *G02B 2027/0114* (2013.01); *G09G 2310/0232* (2013.01); *G09G 2320/0233* (2013.01)

(58) Field of Classification Search
  CPC .............. G02B 26/101; G02B 27/0101; G02B 2027/0114; G02B 2027/014; H04N 9/3161; H04N 9/3132
  See application file for complete search history.

(56) References Cited

U.S. PATENT DOCUMENTS

2008/0095676 A1  4/2008  Andretta
  2009/0116091 A1  5/2009  Overmann et al.
  2009/0273660 A1*  11/2009  Regen ..................... H04N 5/64
    348/14.02
  2010/0020251 A1*  1/2010  Kadijk ..................... H04N 5/58
    348/836
  2010/0073580 A1*  3/2010  Ritz ..................... G03B 21/26
    348/745
  2013/0293591 A1  11/2013  Miller et al.
  2014/0293235 A1*  10/2014  Azuma ................ G03B 21/147
    353/31
  2015/0092115 A1*  4/2015  Micewicz ................ H04N 5/66
    348/798
  2015/0092118 A1*  4/2015  Hada ..................... B60K 35/00
    349/11
  2017/0013239 A1  1/2017  Tabata et al.

FOREIGN PATENT DOCUMENTS

JP   2013-164503 A   8/2013
  JP   2014-130256 A   7/2014
  JP   2015-179917 A  10/2015
  JP   2015-194694 A  11/2015
  WO   2015/146071 A1 10/2015

* cited by examiner

DRAWING APPARATUS AND DRAWING METHOD FOR REDUCED INFLUENCE OF LEAKAGE ON VISIBILITY OF A DISPLAY IMAGE

CROSS-REFERENCE TO RELATED APPLICATIONS

The present application, a continuation of PCT/JP2016/002300, filed May 11, 2016, is based upon and claims the benefit of priority from Japanese Patent Application No. 2015-173412, filed on Sep. 3, 2015 and Japanese Patent Application No. 2016-061069, filed on Mar. 25, 2016, the entire contents of which are hereby incorporated by reference.

BACKGROUND

The present disclosure relates to a drawing apparatus and a drawing method.

As a drawing apparatus, a laser projector that two-dimensionally scans laser light output from a semiconductor laser and draws and displays a desired image on a screen has been developed (see Japanese Unexamined Patent Application Publication No. 2013-164503). At this time, the two-dimensional scanning area is divided into an image drawing area and a blanking area. The image drawing area is an area where an image to be displayed is drawn.
The blanking area is a frame-shaped area surrounding the image drawing area.

Commonly, the I-L characteristic, which is the relationship between a driving current of a laser light source such as a semiconductor laser and an amount of output light, changes due to temperature variations in the laser light source itself. In view of this, in a laser projector described in Japanese Unexamined Patent Application Publication No. 2013-164503, when laser light is shielded by a shielding plate, a driving current of the laser light source is appropriately adjusted to prevent temperature variations in the laser light source itself.

SUMMARY

Incidentally, the applicant of the present disclosure has developed an APC (Auto Power Control) technique. In the APC technique, laser light (hereinafter referred to as "laser light for adjusting an output value of the laser light" or "characteristic detection laser light") is experimentally output from a laser light source, an amount of the output characteristic detection laser light is measured by a photodiode to obtain the I-L characteristic of the laser light source, and a driving current of the laser light source is periodically adjusted based on the I-L characteristic. In the APC technique, for example, the shielding plate or the like similar to the laser projector described in Japanese Unexamined Patent Application Publication No. 2013-164503 is used to shield the characteristic detection laser light so that the characteristic detection laser light will not reach a screen.

The APC technique of related art has adopted a method for shielding the characteristic detection laser light from the image drawing area and has mechanically hidden the characteristic detection laser light from a user. However, with such a drawing apparatus or drawing method, the characteristic detection laser light leaks into the image drawing area or the blanking area, and stray light due to leakage of the characteristic detection laser light may be visible to the user.

An embodiment provides a drawing apparatus including: a laser light source unit configured to output laser light; a scanning mirror unit configured to reflect and scan the laser light; a drawing control unit configured to control an output value of the laser light of the laser light source unit based on display image data so that a display image is drawn by the laser light in a range scanned by the scanning mirror unit; and an output adjustment control unit configured to control the laser light source unit so that characteristic detection laser light for adjusting the output value is output outside a range in which the display image is drawn inside the range scanned by the scanning mirror unit. The output adjustment control unit controls the characteristic detection laser light to be output based on a display color at an end part of the display image.

Another embodiment provides a drawing method including: inputting display image data; controlling an output value of laser light based on the display image data and drawing a display image by the laser light; and outputting characteristic detection laser light for adjusting the output value outside a range of the drawing. In the outputting of the characteristic detection laser light includes outputting the characteristic detection laser light based on a display color at an end part of the display image.

DETAILED DESCRIPTION

Figure 1:
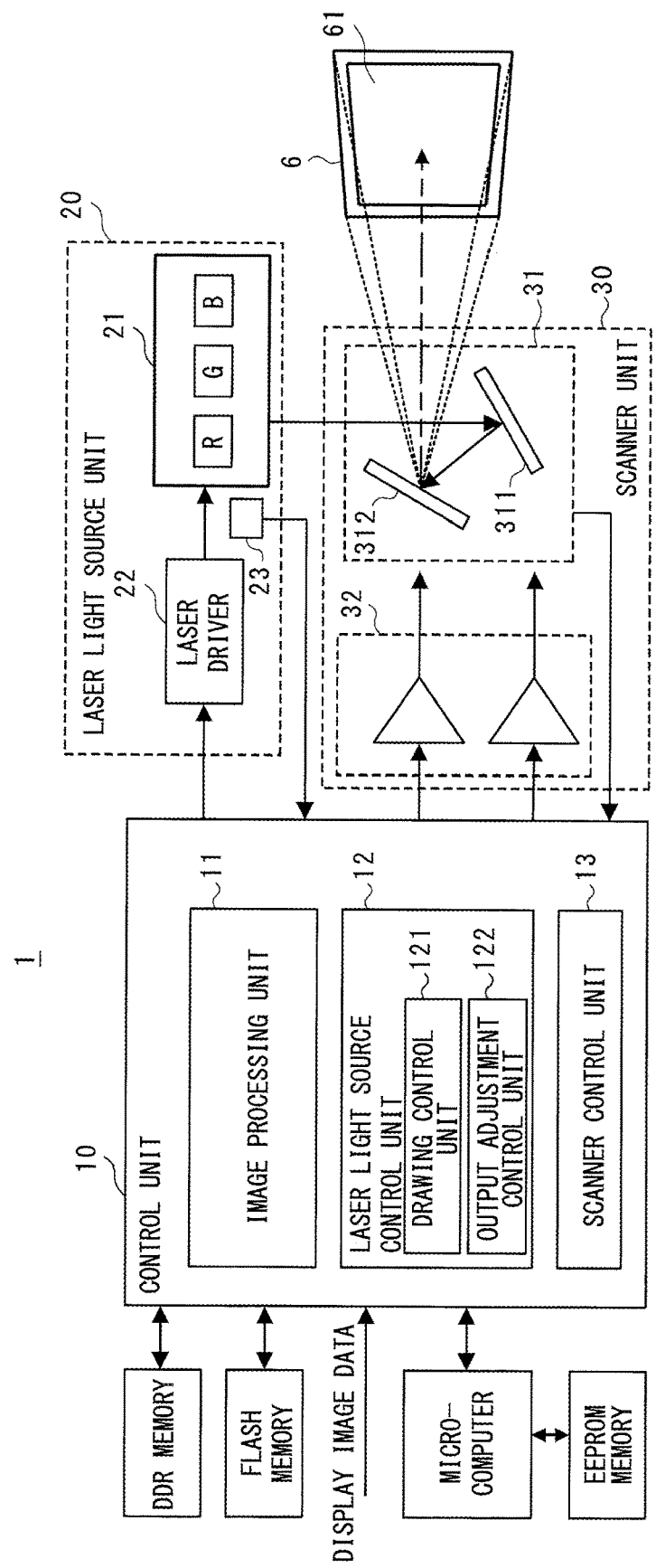
FIG. 1 is a block diagram showing a schematic configuration of a drawing apparatus 1 according to a first embodiment.

Hereinafter, a drawing apparatus and a drawing method according to respective embodiments will be described with reference to the drawings.

First Embodiment

In the drawing apparatus or the drawing method according to a first embodiment, characteristic detection laser light is output in an area continuous to an image drawing area or in an area in the vicinity of the image drawing area that is inside a blanking area based on a display color at an end part of the image drawing area. Thus, even when the characteristic detection laser light temporarily leaks, a difference in a color between the display image and the stray light due to the leakage of the characteristic detection laser light is small, and the influence of the leakage of the characteristic detection laser light on visibility of a display image can be reduced.

First, a configuration of the drawing apparatus according to the first embodiment will be described.

FIG. 1 is a block diagram showing a schematic configuration of the image drawing apparatus 1 according to the first embodiment.

The drawing apparatus 1 is, for example, a head-up display apparatus that is commonly mounted on a vehicle and presents various pieces of information as virtual images to a driver or the like who is a user.

The drawing apparatus 1 includes a control unit 10, a laser light source unit 20, a scanner unit 30, and the like.

The laser light source unit 20 includes a laser module 21 that outputs laser light, a laser driver 22 that drives a laser diode included in the laser module 21, a photodiode 23 that measures an amount of laser light, and the like.

Figure 2:
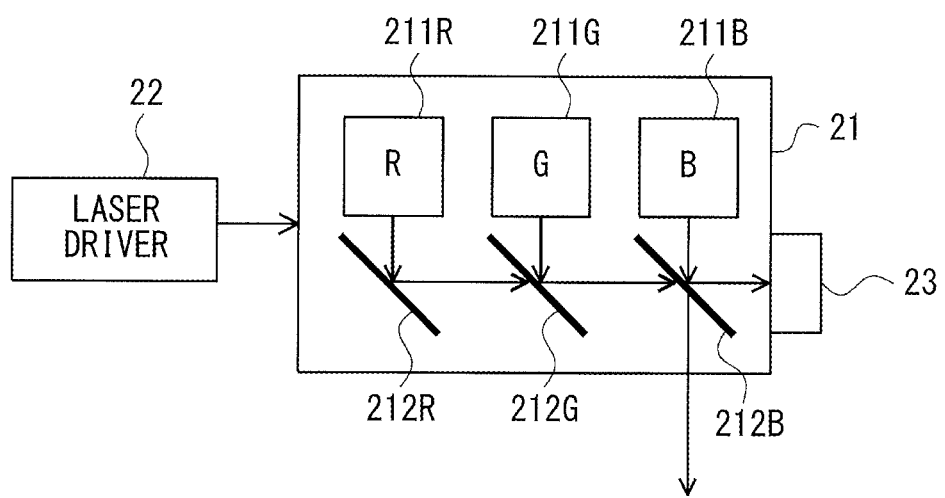
FIG. 2 is a block diagram showing a configuration of a laser light source unit 20 according to the first embodiment.

FIG. 2 is a block diagram showing a configuration of the laser light source unit 20 according to the first embodiment.

The laser module 21 includes a red laser diode 211R, a green laser diode 211G, a blue laser diode 211B, and dichroic mirrors 212R, 212G, and 212B corresponding to the red laser diode 211R, the green laser diode 211G, and the blue laser diode 211B, respectively. Laser light of respective colors output from the laser diodes 211 is multiplexed by the dichroic mirrors 212 and output to the scanner unit 30.

The dichroic mirror 212R has a characteristic of reflecting almost 100% of the light in the red wavelength output from the red laser diode 211R. The dichroic mirror 212G has a characteristic of transmitting almost 100% of light in the red wavelength output from the red laser diode 211R and reflecting almost 100% of light in the green wavelength output from the green laser diode 211G. The dichroic mirror 212B has a characteristic as its characteristic example that it reflects about 98% and transmits about 2% of light in the red wavelength output from the red laser diode 211R and the light in the green wavelength output from the green laser diode 211G. Further, the dichroic mirror 212B has a characteristic as its characteristic example that it transmits about 98% and reflects about 2% of the light in the blue wavelength output from the blue laser diode 211B.

With such a configuration of the dichroic mirrors 212, about 98% of the laser light output from the laser diodes 211 enters the scanner unit 30, and about 2% of the laser light enters the photodiode 23.

The laser driver 22 drives the laser diodes 211 based on a laser driving signal from the control unit 10.

The photodiode 23 measures an amount of incident laser light and outputs a result of the measurement to the control unit 10.

Note that the arrangement of the laser diodes 211 and the dichroic mirrors 212 is not limited to that shown in FIG. 2. The laser diodes 211 and the dichroic mirrors 212 may be arranged in any way as long as they can make outputs to the scanner unit 30 and the photodiode 23 in a manner similar to that described above.

The scanner unit 30 includes a scanner (scanning mirror unit) 31, a scanner driver 32, a scan angle detection unit (not shown), and the like. The scanner 31 reflects and scans the laser light output from the laser light source unit 20. The scanner driver 32 drives the scanner 31. The scan angle detection unit detects a scan angle of the scanner 31.

The scanner 31 includes a vertical mirror 311, a horizontal mirror 312, and the like. The vertical mirror 311 reflects the laser light and scans it in the vertical direction. The horizontal mirror 312 reflects the laser light and scans it in the horizontal direction. Each of the vertical mirror 311 and the horizontal mirror 312 is composed of an MEMS (micro electro mechanical system) mirror or the like.

The scanner driver 32 drives the scanner 31 based on the scanner driving signal from the control unit 10.

When the scanner 31 includes the vertical mirror 311 and the horizontal mirror 312, commonly, the vertical mirror 311 operates at a scan angle and an oscillation frequency controlled by the scanner driver 32, and the horizontal mirror 312 operates at the scan angle and an oscillation frequency at resonance because the oscillation frequency is high. Note that like the vertical mirror 311, the horizontal mirror 312 may operate at the scanning angle and the oscillation frequency controlled by the scanner driver 32.

The control unit 10 includes an image processing unit 11, a laser light source control unit 12, a scanner control unit 13, and the like. The control unit 10 includes, for example, an FPGA (Field Programmable Gate Array) and the like.

The image processing unit 11 adjusts the shape and brightness of drawing for input display image data.

The laser light source control unit 12 outputs the laser driving signal to the laser driver 22 to control the outputs of the laser diodes 211. At this time, the laser light source control unit 12 controls driving of the red, blue, and green laser diodes 211R, 211G, and 211B, respectively, in accordance with the colors and brightness of the drawing image based on the display image data. For this purpose, the laser light source control unit 12 includes a drawing control unit 121, an output adjustment control unit 122, and the like.

The drawing control unit 121 rearranges the display image data processed by the image processing unit 11 into data of reciprocating drawing and outputs it to the laser driver 22. Further, the drawing control unit 121 controls synchronization processing of the laser light source unit 20 and the scanner unit 30, performs control processing of the laser driver 22, and controls an output value of the laser light of the laser light source unit 20, and the like.

Further, the drawing control unit 121 includes a line counter (not shown). The line counter counts the number of lines (pixel rows) of the display image data being output. The drawing control unit 121 evaluates as to whether the line being output is an image drawing area or a blanking area.

The output adjustment control unit 122 sets a position to which the characteristic detection laser light is output based on the display image data relating to an end part of a range (the image drawing area) in which the display image is drawn, so that the characteristic detection laser light for adjusting the output value of the laser light of the laser light source unit 20 is output above, below, left, and right sides of the image drawing area outside the image drawing area and controls the drawing control unit 121. Specifically, the output adjustment control unit 122 controls the drawing control unit 121 so that the characteristic detection laser light based on the display color at the end part of the image drawing area is output at an arbitrary position above, below, left, and right sides of the image drawing area outside the image drawing area.

At this time, the output adjustment control unit 122 also sets an emission color of the characteristic detection laser light based on the display color at the end part of the image drawing area.

The output adjustment control unit 122 further performs APC processing. In the APC processing, the output adjustment control unit 122 evaluates the state of the laser light source unit 20 based on the intensity of the characteristic detection laser light detected by the photodiode 23, determines driving current values of the laser diodes 211 at the time of drawing, and controls the laser driver 22.

The output adjustment control unit 122 adjusts an output for each of the laser diodes 211R, 211G, and 211B in the APC processing. Therefore, when the output of the red laser diode 211R is adjusted, the laser light is output only from the red laser diode 211R. Likewise, when the output of the green laser diode 211G is adjusted, the laser light is output only from the green laser diode 211G. When the output of the blue laser diode 211B is adjusted, the laser light is output only from the blue laser diode 211B.

The scanner control unit 13 outputs the scanner driving signal to the scanner driver 32 and controls scanning of the laser light by the scanner 31. The scanner control unit 13 monitors a detection signal of the scan angle detection unit (not shown) that detects the scan angle of the scanner 31 and performs control on the scan angle, waveform generation, oscillation frequency, and the like of the scanner 31.

In such a configuration, the scanner unit 30 reflects and scans the laser light output from the laser light source unit 20 based on the display image data input by the control unit 10, and projects the laser light on the screen 6, thereby drawing a display image 61. When the drawing apparatus 1 is a head-up display apparatus, the screen 6 is commonly an intermediate image screen. Although the configuration of the head-up display apparatus is not shown, a drawing image projected on the intermediate image screen is projected onto a combiner or a windshield of an automobile via reflection of a concave mirror or the like.

Note that the respective components implemented by the control unit 10 can be implemented by executing programs under the control of a calculation apparatus (not shown) included in the control unit 10, which is, for example, a computer. More specifically, the control unit 10 loads programs stored in a storage unit (not shown) to a main storage apparatus (not shown) and implements the respective components by executing the programs under the control of the calculation apparatus. Further, the respective components may not only be implemented by software including programs but also implemented by a combination of hardware, firmware, and software and the like.

The above-mentioned programs can be stored and provided to the control unit 10 using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (erasable PROM), flash ROM, RAM (random access memory), etc.).

The program may be provided to the control unit 10 using any type of transitory computer readable media. Examples of transitory computer readable media include electric signals, optical signals, and electromagnetic waves. Transitory computer readable media can provide the program to the control unit 10 via a wired communication line (e.g. electric wires, and optical fibers) or a wireless communication line.

Next, an operation of the drawing apparatus 1 according to the first embodiment, i.e., a drawing method will be described.

Figure 3:
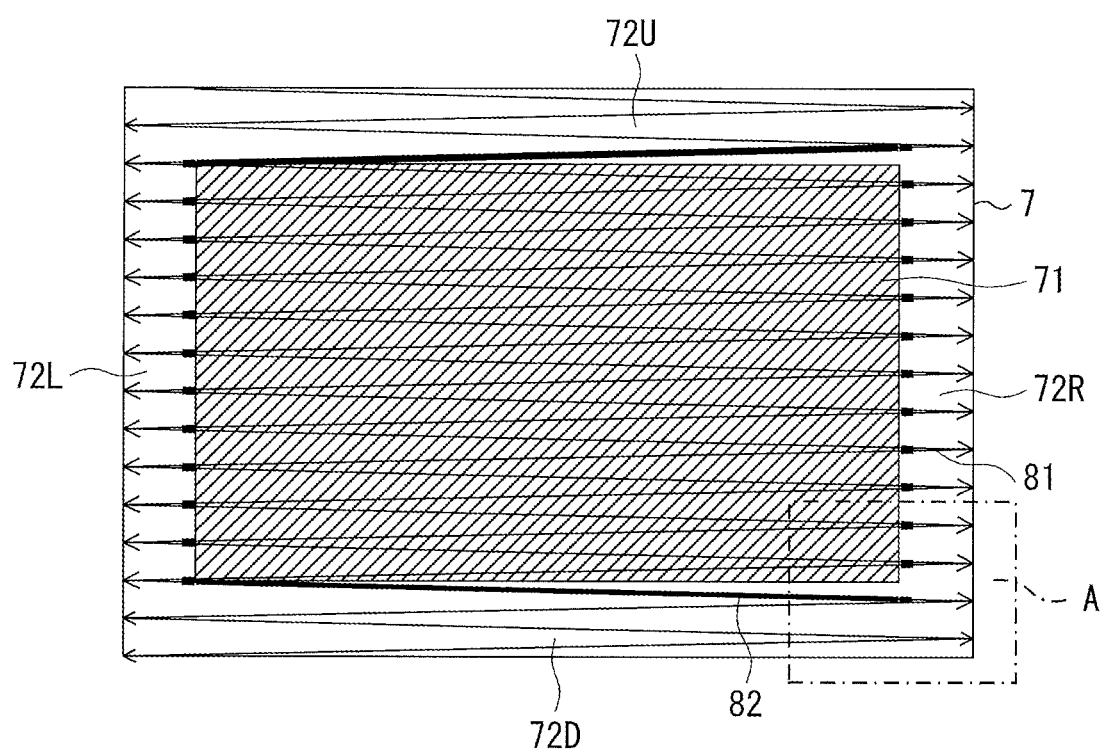
FIG. 3 is a diagram for describing an output position of characteristic detection laser light according to the first embodiment.

FIG. 3 is a diagram for describing the output position of the characteristic detection laser light according to the first embodiment.

A scanning area 7 is an area in which the laser light can be scanned by the scanner 31. As mentioned above, the scanning area 7 is divided into an image drawing area 71 and a blanking area 72. The image drawing area 71 is a rectangular area where laser light for drawing a display image is output. The blanking area 72 is an area where the laser light for drawing the display image is not output. Here, it is assumed that the blanking area 72 is composed of an upper blanking area 72U, a lower blanking area 72D, a left blanking area 72L, and a right blanking area 72R.

In the drawing method according to the first embodiment, a scanning trajectory 81 (thin solid lines) of the scanner 31 falls within the range of the scanning area 7. The scanner 31 reciprocally raster-scans the scanning area 7 between the left and right sides from the upper side to the lower side of the scanning area 7 and then scans to return from the lower side to the upper side of the scanning area 7 (the returning scanning lines are not shown).

Further, a scanning trajectory 82 (thick solid lines) in the period during which the characteristic detection laser light is output is in an area continuous (adjacent) to the image drawing area 71 or in an area in the vicinity of the image drawing area 71 inside the blanking area 72. That is, the characteristic detection laser light is output in pixel rows or pixel columns that are continuous to the image drawing area 71 or in pixel rows or pixel columns in the vicinity of the image drawing area 71.

The output position of the characteristic detection laser light is set to a position continuous to or in the vicinity of the image drawing area 71, and the color of the characteristic detection laser light and the display color at the end part of the image drawing area are the same color or colors similar to each other. For this reason, even when the stray light of the characteristic detection laser light exerts an influence on the display image, the display color of the display image and the color of the stray light due to the leakage of the characteristic detection laser light are the same or the difference between these colors is small. Accordingly, the influence of the leakage of the detection laser light on the visibility of the display image is small.

Figure 4:
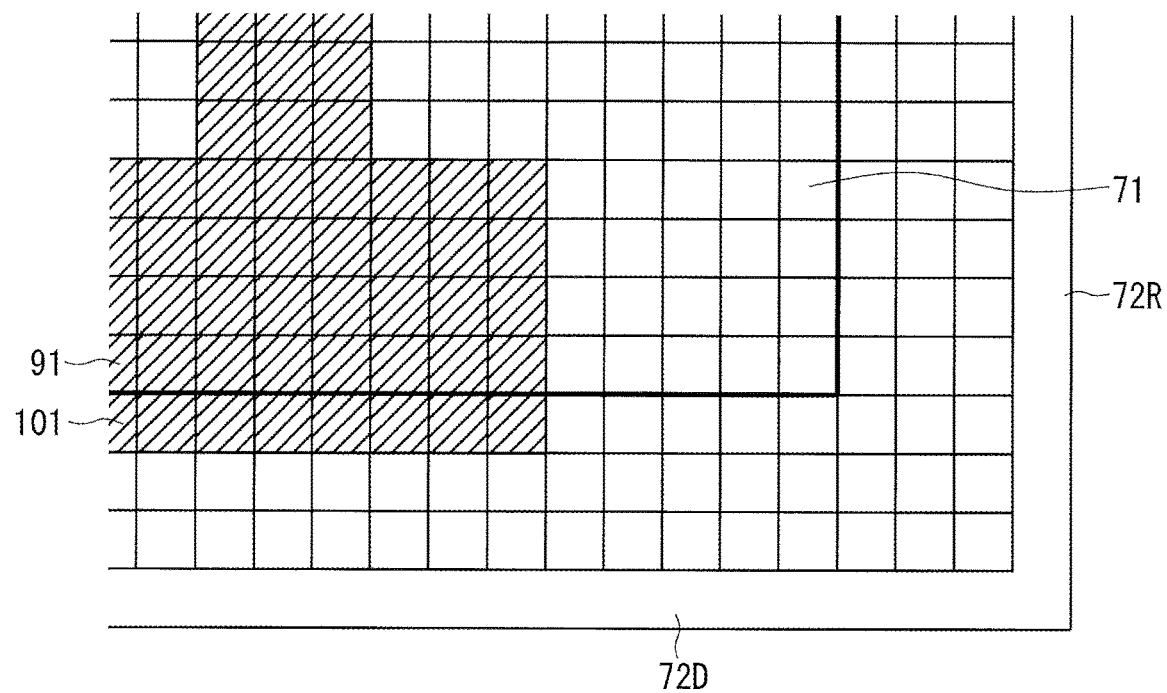
FIG. 4 is a diagram for describing a relationship between display image data and data for outputting the characteristic detection laser light according to the first embodiment.
Figure 5:
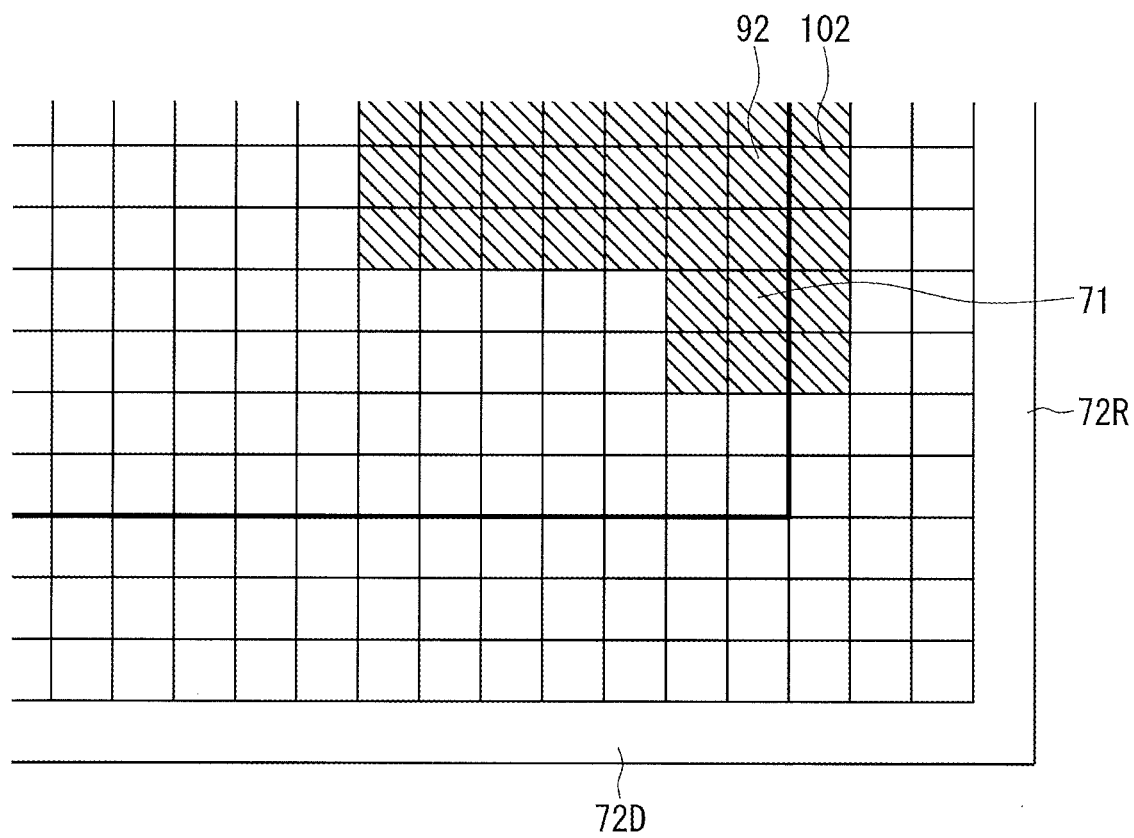
FIG. 5 is a diagram for describing a relationship between the display image data and data for outputting the characteristic detection laser light according to the first embodiment.
Figure 6:
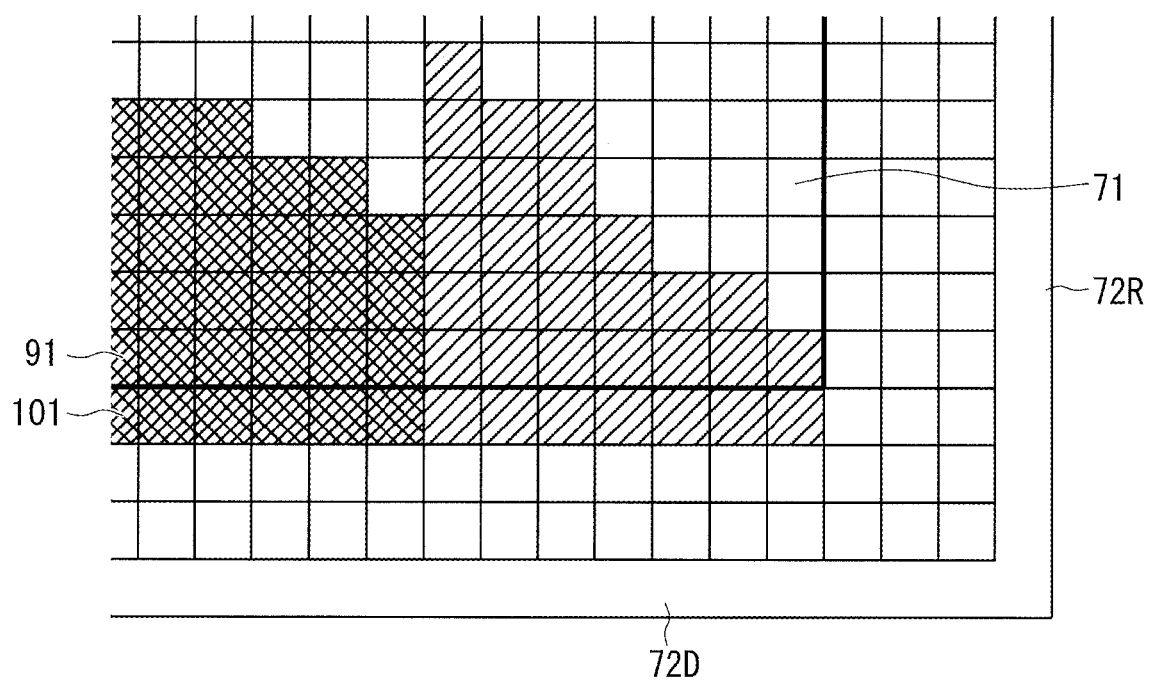
FIG. 6 is a diagram for describing a relationship between the display image data and data for outputting the characteristic detection laser light according to the first embodiment.

FIGS. 4 to 6 are diagrams for describing the relationship between the display image data and the data for outputting the characteristic detection laser light according to the first embodiment. FIGS. 4 to 6 show data of a part corresponding to an area A of FIG. 3. Each square indicates display image data for one pixel or data for outputting the characteristic detection laser light for one pixel. In each square, in (hatched) areas where it is necessary to output the laser light for drawing or the characteristic detection laser light, the laser light or the characteristic detection laser light is output. On the other hand, in (non-hatched) areas where it is not necessary to output the laser light for drawing or the characteristic detection laser light, the laser light for drawing or the characteristic detection laser light is not output.

Note that the bold line in FIG. 4 is for clearly indicating the boundary between the image drawing area 71 and the blanking area 72. Such a thick line does not actually exist.

In the example shown in FIG. 4, the laser light for drawing draws the display image including a pixel row 91 at the lower end of the image drawing area 71 based on the display image data.

When the display color of the pixel row 91 is the same color as or a color similar to any one of the colors R, G, and B of the laser light of the respective laser diodes 211, for example, when it is a red or reddish color (indicated by hatching from upper right to lower left), the output adjustment control unit 122 generates the data for outputting the characteristic detection laser light in a pixel row 101 at the upper end of the (lower) blanking area 72D that is continuous (adjacent) to the pixel row 91.

At this time, the output adjustment control unit 122 generates the data for outputting the red characteristic detection laser light so that the range (the number of pixels) to which the red characteristic detection laser light is to be output will become the same or substantially the same as the range (the number of pixels) of the pixel row 91 to be drawn by the laser light for drawing in the red or reddish color.

Then, in the pixel row 101, only the red laser diode 211R outputs the characteristic detection laser light.

When the display color of the pixel row 91 is red, the output adjustment control unit 122 uses the display image data of the pixel row 91 as it is as the data for outputting the red characteristic detection laser light in the pixel row 101 to control the red laser diode 211R to output the characteristic detection laser light.

Further, when the percentage of the pixels whose display color is, for example, a red or reddish color is a predetermined ratio or greater, e.g. 90% to 95% or greater in the pixel row 91, the output adjustment control unit 122 may generate the data for outputting the red characteristic detection laser light in the pixel row 101 to control the red laser diode 211R to output the characteristic detection laser light.

As the characteristic detection laser light is shielded by a shielding plate or the like, in principle, the characteristic detection laser light draws nothing in the pixel row 101 on the screen 6.

In the example shown in FIG. 5, the laser light for drawing draws the display image including a pixel column 92 at the right end of the image drawing area 71.

Further, when the display color of the pixel row 92 is, for example, a green or greenish color (indicated by hatching from the upper left to the lower right), the output adjustment control unit 122 generates the data for outputting the green characteristic detection laser light in a pixel column 102 at the left end of the right blanking area 72R that is continuous (adjacent) to the pixel row 92. Then, in the pixel column 102, only the green laser diode 211G outputs the characteristic detection laser light In the example shown in FIG. 6, the laser light for drawing draws the display image including the pixel row 91 at the lower end of the image drawing area 71.

Furthermore, when the display color of the pixel row 91 is, for example, a blue or bluish color (indicated by cross hatching) and a red or reddish color, the output adjustment control unit 122 generates the data for outputting the blue characteristic detection laser light and the data for outputting the red characteristic detection laser light in the pixel row 101 at the upper end of the lower blanking area 72D that is continuous (adjacent) to the pixel row 91. Then, in the pixel row 101, the blue laser diode 211B and the red laser diode 211 R output the characteristic detection laser light in this order.

Next, the output adjustment control unit 122 checks as to whether or not the output value of the characteristic detection laser light has reached a predetermined value from a result of the measurement of the amount of the characteristic detection laser light measured by the photodiode 23, i.e., whether or not the output value of the laser light (including the laser light for drawing) has reached the predetermined value. When the output value of the laser light differs from the predetermined output value, the output adjustment control unit 122 controls the drawing control unit 121 so that the laser light is output at the predetermined output value.

In the examples shown in FIGS. 4 to 6, in the pixel row or the pixel column at the end part of the blanking area 72 that is continuous (adjacent) to the image drawing area 71, the output adjustment control unit 122 controls the characteristic detection laser light to be output. However, the output adjustment control unit 122 may control the characteristic detection laser light to be output in the pixel row or the pixel column in the vicinity of the image drawing area 71 inside the blanking area 72.

Figure 7:
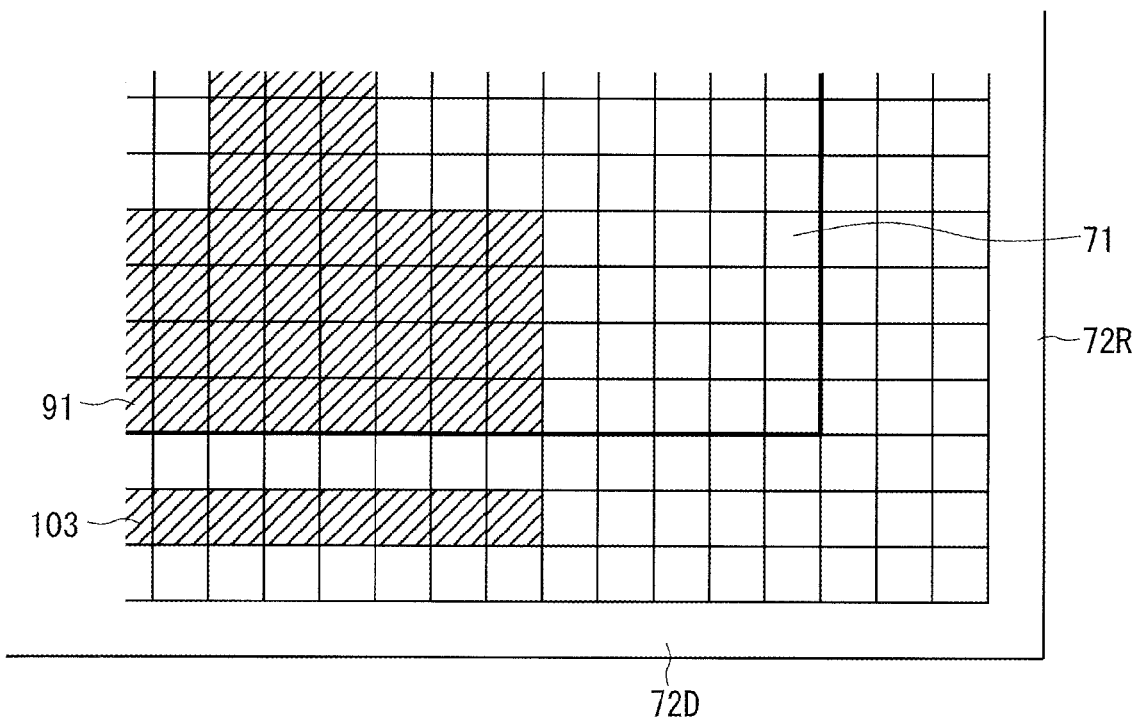
FIG. 7 is another diagram for describing a relationship between the display image data and data for outputting the characteristic detection laser light according to the first embodiment.
Figure 8:
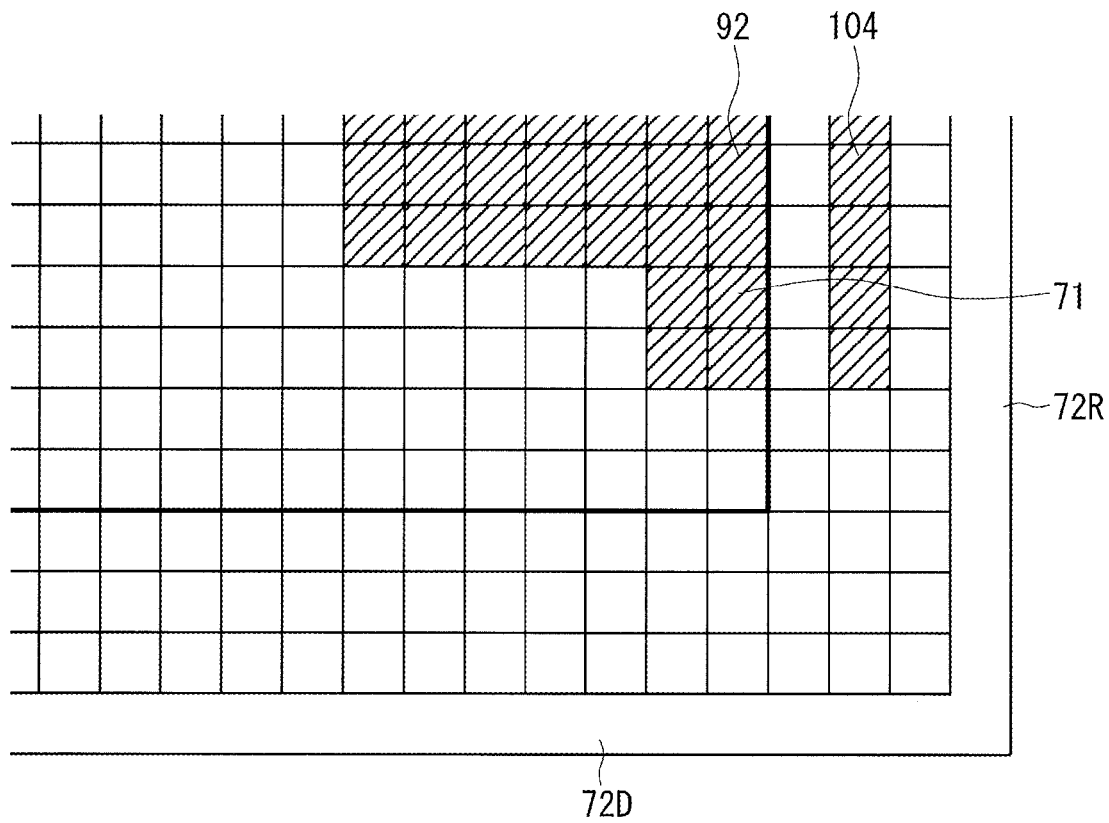
FIG. 8 is another diagram for describing a relationship between the display image data and data for outputting the characteristic detection laser light according to the first embodiment.

FIGS. 7 and 8 are other diagrams for describing the relationship between the display image data and the data for outputting the characteristic detection laser light according to the first embodiment.

In the example shown in FIG. 7, laser light for drawing draws the display image including the pixel row 91 at the lower end of the image drawing area 71 based on the display image data.

Further, when the display color of the pixel row 91 is, for example, a red or reddish color, the output adjustment control unit 122 generates the data for outputting the red characteristic detection laser light in a pixel row 103 that is one pixel row inside the upper end of the lower blanking area 72D in the vicinity of the pixel row 91. Then, in the pixel row 103, only the red laser diode 211R outputs the characteristic detection laser light.

Note that according to scanning intensity of the laser light (or the characteristic detection laser light), the characteristic detection laser light may be output to a pixel row two to five pixel rows inside the upper end of the lower blanking area 72D instead of outputting the characteristic detection laser light to the pixel row 103 that is one pixel row inside the upper end of the lower blanking area 72D.

In the example shown in FIG. 8, the laser light for drawing draws the display image including the pixel column 92 at the right end of the image drawing area 71.

When the display color of the pixel column 92 is, for example, a red or reddish color, the output adjustment control unit 122 generates the data for outputting the red characteristic detection laser light in a pixel column 104 that is one pixel row inside the left end of the right blanking area 72R in the vicinity of the pixel column 92. Then, in the pixel column 104, only the red laser diode 211R outputs the characteristic detection laser light.

As described above, the drawing apparatus or the drawing method according to the first embodiment controls the characteristic detection laser light to be output in an area continuous to the image drawing area 71 or an area in the vicinity of the image drawing area 71 inside the blanking area 72 based on the display color at the end part of the image drawing area 71. Accordingly, even when the characteristic detection laser light leaks temporarily, the difference between the color of the display image and the color of the stray light due to the leakage of the characteristic detection laser light is small. It is thus possible to reduce the influence of the leakage of the characteristic detection laser light on the visibility of the display image.

Second Embodiment

In the drawing apparatus 1 or the drawing method according to the first embodiment, the characteristic detection laser light is output based on the display color at the end part of the image drawing area 71. However, in a drawing apparatus or a drawing method according to a second embodiment, characteristic detection laser light is output based on a display color inside the image drawing area 71. Thus, even when the same color as or a color similar to the color of the laser light of the laser diode 211 is not displayed at the end part of the image drawing area 71, the APC processing can be performed as appropriate.

Note that a configuration of the drawing apparatus according to the second embodiment may be the same as the configuration of the drawing apparatus 1 according to the first embodiment. Thus, illustration and description of the drawing apparatus according to the second embodiment will be omitted here.

Figure 9:
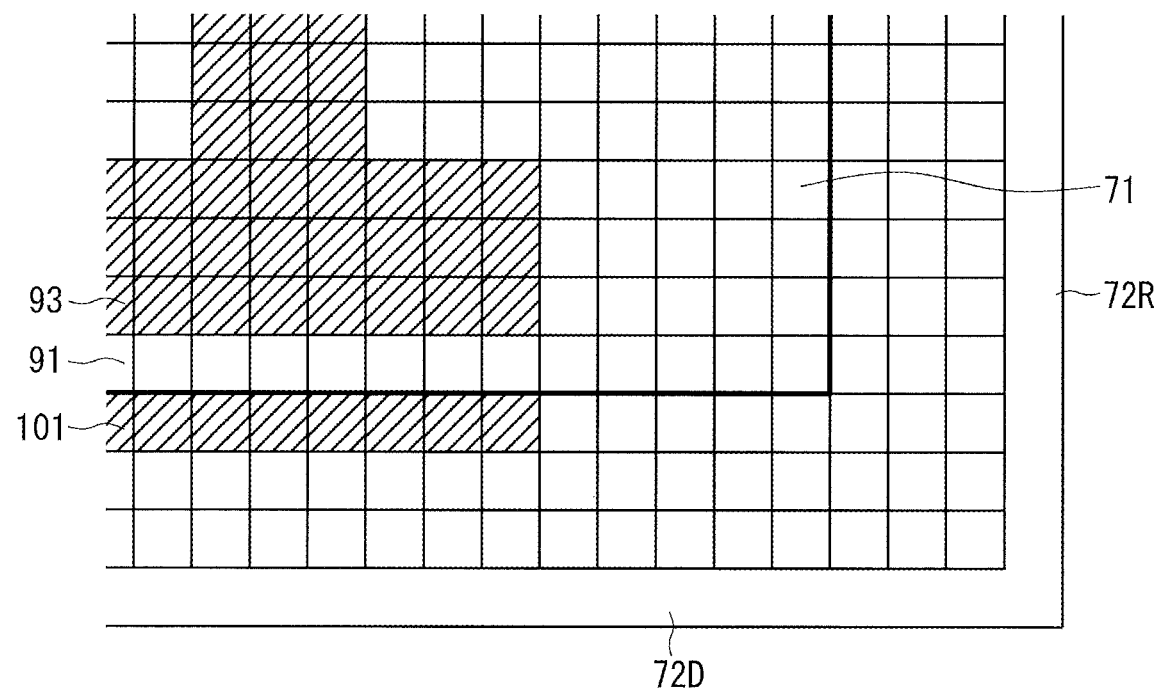
FIG. 9 is a diagram for describing a relationship between display image data and data for outputting the characteristic detection laser light according to a second embodiment.
Figure 10:
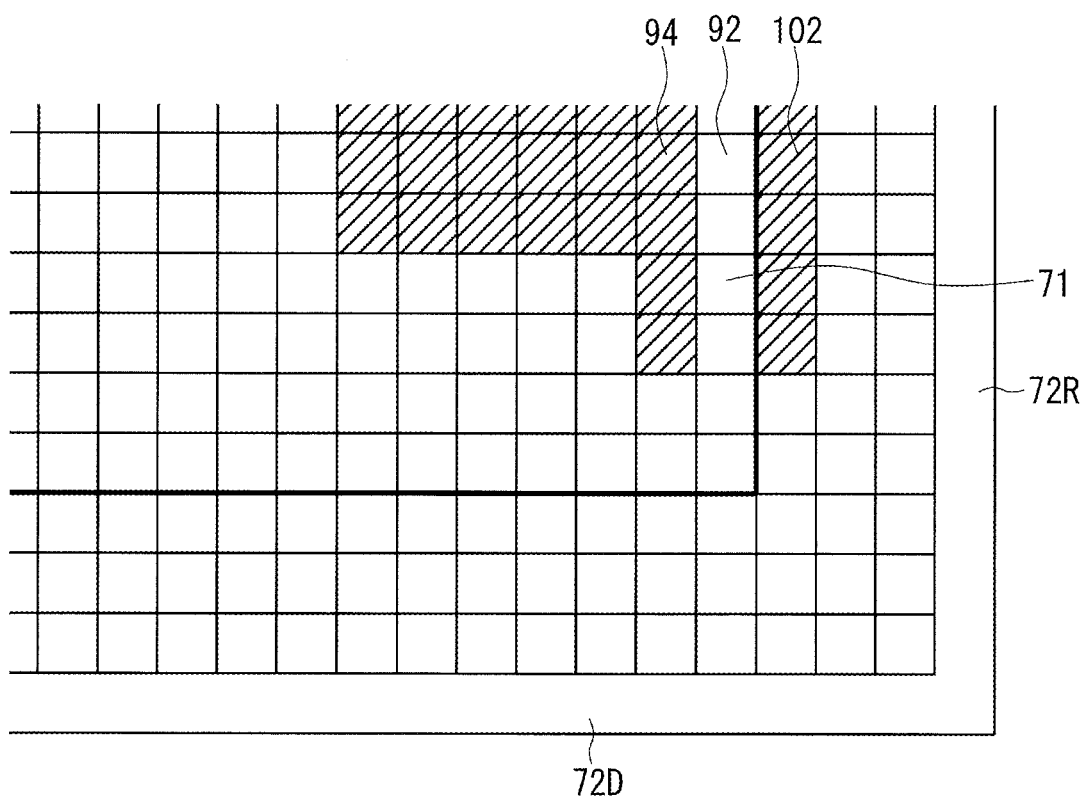
FIG. 10 is a diagram for describing a relationship between the display image data and the data for outputting the characteristic detection laser light according to the second embodiment.

FIGS. 9 and 10 are diagrams for describing the relationship between the display image data and the data for outputting the characteristic detection laser light according to the second embodiment. FIGS. 9 and 10 also show data of a part corresponding to the area A of FIG. 3. In the example shown in FIG. 9, the laser light for drawing draws the display image including a pixel row 93 that is one pixel row inside the lower end of the image drawing area 71 based on the display image data. However, there is no display image data in the pixel row 91 at the lower end of the image drawing area 71. Thus, the laser light for drawing is not output in the pixel row 91 and nothing is drawn in the pixel row 91 as a matter of course.

In this way, when there is no display image data in the pixel row 91 at the lower end of the image drawing area 71, and the state in which the laser light for drawing is not output in the pixel row 91 continues for a predetermined period, the output adjustment control unit 122 checks as to whether or not there is the display image data in a pixel row inside the lower end of the image drawing area 71, for example, in the pixel row 93. Then, when there is the display image data in the pixel row 93, and the display color of the pixel row 93 is the same as or a color similar to any one of the colors R, G, and B of the laser light of the respective laser diodes 211, for example, a red or red color, the output adjustment control unit 122 generates the data for outputting the red characteristic detection laser light in the pixel row 101 at the upper end of the lower blanking area 72D that is continuous to the pixel row 91.

Then, in the pixel row 101, only the red laser diode 211R outputs the characteristic detection laser light.

Note that the pixel row inside the lower end of the image drawing area 71 may be, other than the pixel row 93 that is one pixel row inside the lower end of the image drawing area 71, a pixel row two to five pixel rows inside the lower end of the image drawing area 71 according to scanning intensity of the laser light (or the characteristic detection laser light) and the like.

In the example shown in FIG. 10, there is no display image data in the pixel column 92 at the right end of the image drawing area 71, and the laser light for drawing is not output in the pixel row 92. When such a state continues for a predetermined period of time, the output adjustment control unit 122 checks as to whether or not there is display image data in a pixel column inside the right end of the image drawing area 71, for example, in the pixel column 94. When there is display image data in the pixel column 94, the output adjustment control unit 122 generates the data for outputting the characteristic detection laser light in the pixel column 102 at the left end of the right blanking area 72R that is continuous to the pixel column 92 based on the display color of the pixel column 94 and controls the characteristic detection laser light to be output.

Note that like the drawing apparatus or the drawing method according to the first embodiment, the output adjustment control unit 122 may control the characteristic detection laser light to be output in a pixel row or a pixel column inside the blanking area 72 instead of a pixel row or a pixel column at the end part of the blanking area 72.

Figure 11:
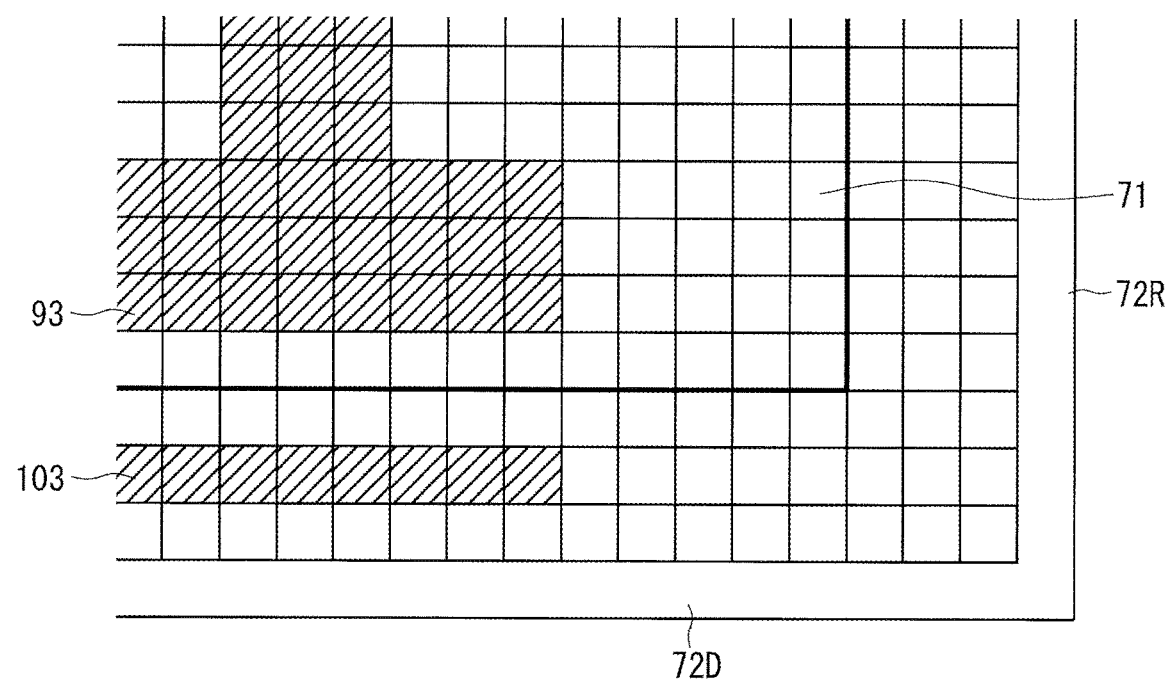
FIG. 11 is another diagram for describing a relationship between the display image data and the data for outputting the characteristic detection laser light according to the second embodiment.
Figure 12:
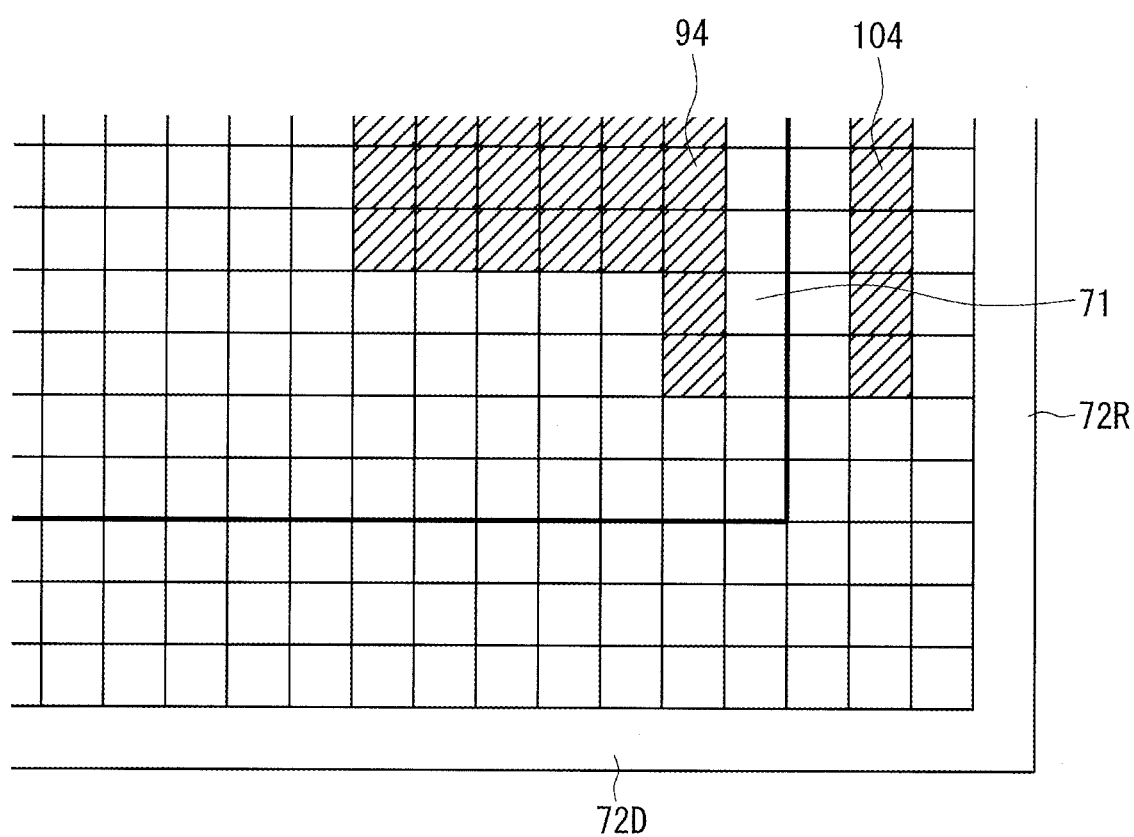
FIG. 12 is another diagram for describing a relationship between the display image data and the data for outputting the characteristic detection laser light according to the second embodiment.

FIGS. 11 and 12 are other diagrams for describing the relationship between the display image data and the data for outputting the characteristic detection laser light according to the second embodiment.

In the example shown in FIG. 11, the output adjustment control unit 122 generates the data for outputting the characteristic detection laser light in the pixel row 103 inside the lower blanking area 72D based on the display color of the pixel row 93 inside the lower end of the image drawing area 71. Then, in the pixel row 103, any one of the laser diodes 211R, 211G, and 211B outputs the characteristic detection laser light.

In the example shown in FIG. 12, the output adjustment control unit 122 generates the data for outputting the characteristic detection laser light in the pixel column 104 inside the right blanking area 72R based on the display color of the pixel column 94 inside the right end of the image rendering area 71. Then, in the pixel column 104, one laser diode 211 outputs the characteristic detection laser light.

In the examples shown in FIGS. 11 and 12, the number of pixel rows or columns between a pixel row or a pixel column in which the display image is drawn and a pixel row or a pixel column to which the characteristic detection laser light is output may be two to five according to scanning intensity of the laser light (or the characteristic detection laser light).

As described above, in the drawing apparatus 1 or the drawing method according to the second embodiment, the characteristic detection laser light is output to the blanking area 72 based on the display color inside the image drawing area 71. In this way, even when the same color as or a color similar to the color of the laser light of the laser diode 211 is not displayed at the end part of the image drawing area 71, the APC processing can be performed as appropriate.

In the drawing apparatus or the drawing method according to the first and second embodiments, the characteristic detection laser light is output in one pixel row or one pixel column in the blanking area. However, the characteristic detection laser light may be output in a plurality of pixel rows (e.g., pixel rows 101 and 103) or a plurality of pixel columns (e.g., pixel columns 102 and 104) as long as no influence is exerted on the visibility.

Further, in the drawing apparatus or the drawing method according to the first and second embodiments, the characteristic detection laser light is output in the upper, lower, right and left sides of the image drawing area 71. However, when the driving current of the laser light source can be adjusted, the characteristic detection laser light may be output to any one of the above, below, left, and right sides of the image drawing area 71 and a part of the above, below, left, and right sides of the image drawing area 71, for example, a part of the pixel row 101 of the blanking area that is continuous (adjacent) to the pixel row 91 of the image drawing area 71.

Furthermore, the drawing apparatus or drawing method according to first and second embodiments is described on the assumption that the characteristic detection laser light is shielded by the shielding plate (not shown), and the characteristic detection laser light draws nothing on the screen 6. However, the configuration and procedure for hiding the characteristic detection laser light such as the shielding plate may be omitted, and the characteristic detection laser light may draws an image on the screen 6 as long as no influence is exerted on the visibility. For example, even when the same drawing as that of one pixel row or one pixel column at the end part of the display image is made in the blanking area 72 that is continuous to the image drawing area 71, the influence on the visibility of the display image is small.

Moreover, in the drawing apparatus or the drawing method according to the first and second embodiments, when the display image is black and there is no drawing (in this case, it is not originally necessary to adjust the output value of the laser light), the characteristic detection laser light may be output at a small output value with a low level of visibility in order to adjust the output value of the laser light for a case where the display image is changed and the drawing is started.

As described above, the drawing apparatus 1 according to the first and second embodiments includes the laser light source unit 20 that outputs output laser light, the scanning mirror unit 31 that reflects and scans the laser light, the drawing control unit 121 that controls the output value of the laser light of the laser light source unit 20 based on display image data so that a display image 61 is drawn by the laser light in a range scanned by the scanning mirror unit 31; and the output adjustment control unit 122 that controls the laser light source unit 20 so that characteristic detection laser light for adjusting the output value is output outside the range in which the display image 61 is drawn inside the range 7 scanned by the scanning mirror unit 31. The output adjustment control unit 122 controls the characteristic detection laser light to be output based on the display color at an end part of the display image 61 (e.g., the pixel rows 91 and 93 and the pixel columns 92 and 94).

In the drawing apparatus 1 according to the first and second embodiments, the output adjustment control unit 122 preferably controls the characteristic detection laser light that is the same color as or a color similar to the display color to be output continuously from the end part of the display image.

Moreover, in the drawing apparatus 1 according to the first and second embodiments, the output adjustment control unit 122 preferably controls the characteristic detection laser light that is the same color as or a color similar to the display color to be output in the vicinity of the end part of the display image.

Further, in the drawing apparatus 1 according to the first and second embodiments, the output adjustment control unit 122 can repeatedly control the characteristic detection laser light to be output in a plurality of rows (e.g., the pixel rows 101 and 103) or a plurality of columns (e.g., the pixel columns 102 and 104).

The drawing method according to the first and second embodiments includes inputting the display image data; controlling the output value of the laser light based on the display image data and drawing the display image 61 by the laser light, and outputting the characteristic detection laser light for adjusting the output value outside the range 72 of the drawing. The outputting of the characteristic detection laser light includes outputting the characteristic detection laser light based on the display color at the end part of the display image 61.

The drawing apparatus according to the above-described first and second embodiments can be described as, but not limited to, the following supplementary notes.
(Supplementary note 1) A drawing apparatus comprising:
 a laser light source unit configured to output laser light;
 a scanning mirror unit configured to reflect and scan the laser light;
 a drawing control unit (a video output unit) configured to control an output value of the laser light based on display image data; and
 an output adjustment control unit (an APC emission control unit) configured to control emission of characteristic detection laser light in order to adjust the output value, wherein the output adjustment control unit controls the characteristic detection laser light to be output based on the display image data relating to an end part of a display image.
(Supplementary note 2) A drawing apparatus comprising:
 a laser light source unit configured to output laser light;
 a scanning mirror unit configured to reflect and scan the laser light;
 a drawing control unit configured to control an output value of the laser light of the laser light source unit based on display image data so that a display image is drawn by the laser light in a range scanned by the scanning mirror unit; and
 an output adjustment control unit configured to control the laser light source unit so that characteristic detection laser light for adjusting the output value is output outside a range in which the display image is drawn inside the range scanned by the scanning mirror unit, wherein the output adjustment control unit controls the characteristic detection laser light to be output based on the display image data relating to an end part of the display image.

The drawing apparatus according to the embodiments outputs characteristic detection laser light for adjusting an output value of laser light based on a display color at an end part of a display image to periodically adjust a driving current of a laser light source and is susceptible of industrial application.

What is claimed is:
1. A drawing apparatus comprising:
 a laser light source unit configured to output laser light;
 a scanning mirror unit configured to reflect and scan the laser light;
 a computer configured to execute a program stored in a storage unit to:
  control an output value of the laser light of the laser light source unit based on display image data so that a display image is drawn by the laser light in an image drawing area, the image drawing area being an area in which the display image is drawn in a scanning range scanned by the scanning mirror unit;
  control the laser light source unit so that characteristic detection laser light for adjusting the output value is output in a blanking area, the blanking area being adjacent to the image drawing area inside the scanning range scanned by the scanning mirror unit and not being an area in which the display image is drawn, wherein
 controlling the laser light source unit includes controlling, when a display color at an end part of the display image and a color of the characteristic detection laser light are the same color or colors similar to each other, the characteristic detection laser light to be output in an area in the vicinity of the image drawing area that is inside the blanking area or in an area continuous to the image drawing area that is inside the blanking area.

2. The drawing apparatus according to claim 1, wherein the computer is further configured to control the characteristic detection laser light to be output repeatedly in a plurality of rows or a plurality of columns.

3. The drawing apparatus according to claim 1, wherein the computer is further configured to control a laser diode included in the laser light source unit to output, as the characteristic detection laser light, laser light of a color corresponding to the laser diode and controls, when the display color at the end part of the display image and the color of the characteristic detection laser light are the same color or colors similar to each other, the laser diode to output the characteristic detection laser light.

4. The drawing apparatus according to claim 3, wherein the computer is further configured to control the characteristic detection laser light to be output repeatedly in a plurality of rows or a plurality of columns.

5. A drawing method comprising:
inputting display image data;
controlling an output value of laser light based on the display image data and drawing a display image by the laser light in an image drawing area, the image drawing area being an area in which the display image is drawn in a scanning range in which the laser light is scanned; and
controlling characteristic detection laser light for adjusting the output value to be output in a blanking area, the blanking area being adjacent to the image drawing area inside the scanning range and not being an area in which the display image is drawn, wherein
the controlling of the characteristic detection laser light includes controlling, when a display color at an end part of the display image and a color of the characteristic detection laser light are the same color or colors similar to each other, the characteristic detection laser light to be output in an area in the vicinity of the image drawing area that is inside the blanking area or in an area continuous to the image drawing area that is inside the blanking area.

* * * * *